UNITED STATES PATENT OFFICE.

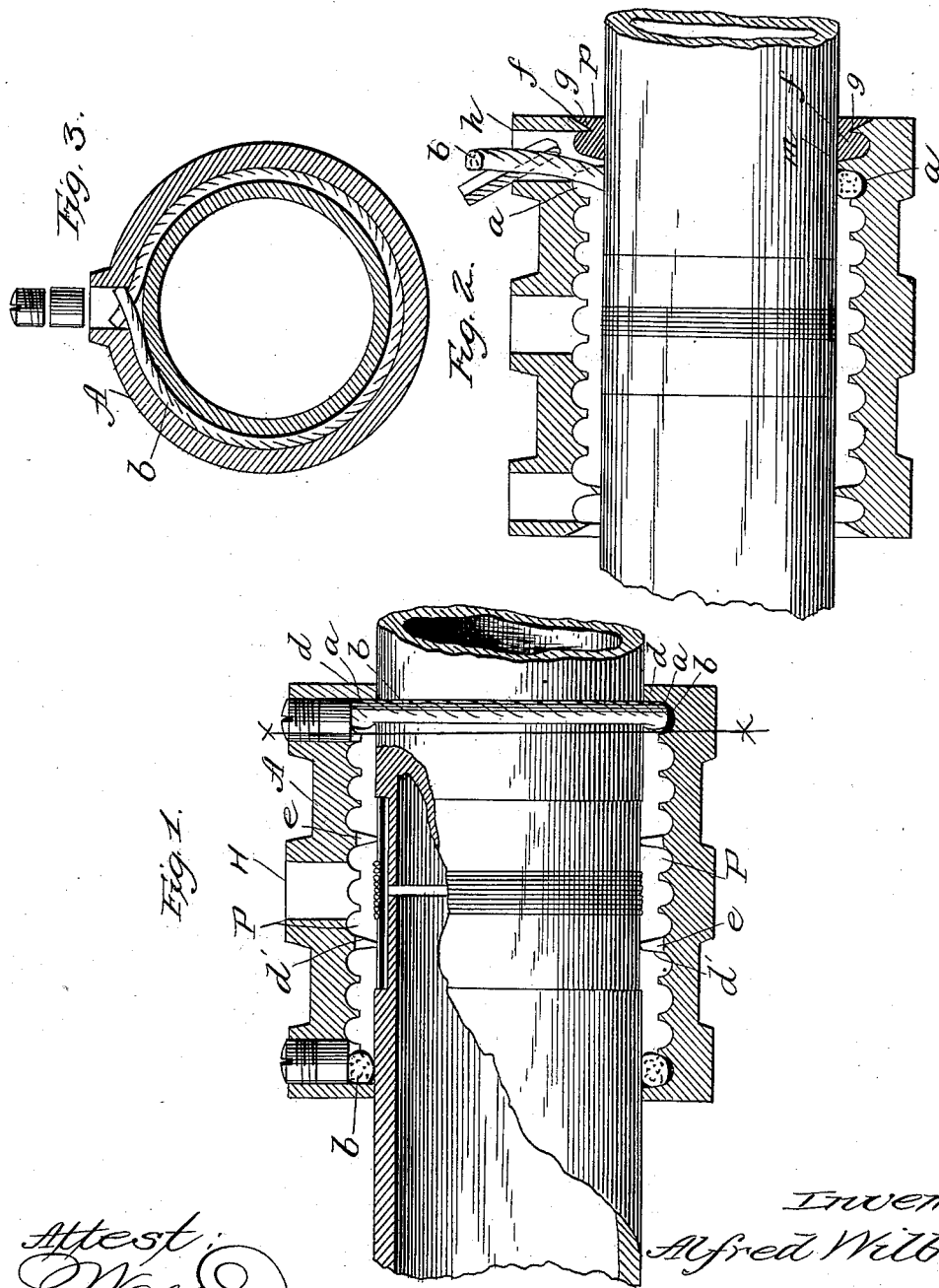

ALFRED WILBUR, OF ALLEGHENY CITY, PENNSYLVANIA.

PIPE-COUPLING.

SPECIFICATION forming part of Letters Patent No. 376,458, dated January 17, 1888.

Application filed August 20, 1887. Serial No. 247,424. (No model.)

*To all whom it may concern:*

Be it known that I, ALFRED WILBUR, of Allegheny City, in the county of Allegheny and State of Pennsylvania, have invented a new and useful Improvement in Pipe-Couplings; and I do hereby declare that the following is a full, clear, and exact description of the same.

My invention relates to pipe-couplings; and it is designed especially for coupling pipes used to carry natural gas, which is often under very high pressure; but it is not limited to that use, and is adapted to pipes, under any circumstances, designed to convey air, gas, or water.

This coupling consists of a rope packing laid in a groove in the inner surface of a sleeve near the end for retaining the filling of asphaltum or any suitable or similar preparation in the sleeve and about the pipe end.

It consists, further, in combining the rope packing with a lead packing, and of details of construction of the sleeve, all as hereinafter explained.

In the accompanying drawings, Figure 1 is a central longitudinal section of my improved device. Fig. 2 is a central longitudinal section of a modified form. Fig. 3 is a transverse section on line $x$ $x$ of Fig. 1.

Referring to the drawings, A represents a sleeve of suitable diameter and length for the size of pipe to which it is applied, and of any desired material, which, from the peculiarity of the sleeve and packing, may be of cast-iron. The inner surface of the sleeve, as shown in the longitudinal section, is formed with circumferential grooves and ribs except in the center, which may be plain or ribbed. At the center, also, is a hole, H, for admitting the filling. While the rope packing is the same, the sleeve construction is somewhat modified in one figure, and there is a lead packing added to the rope packing.

In Fig. 1, which shows rope packing only, there is an interior peripheral groove, $a$, at each end sufficiently deep to receive a rope packing, $b$, and allow it to lie flush, when pushed down quite into the groove, with the top of the bordering ribs, so that the pipe may be introduced freely through the loop of the rope. The rope ends extend outside through holes $h$, made from the groove $a$ at each end to the outside. The rib $d$ outside the rope-groove $a$ is intended to fit the pipe approximately close, and has a flat or plain bearing-edge. There is another circumferential rib, $d'$, near the interior or center of the sleeve, of the same interior diameter as the rib $d$, and also calculated to fit the pipe, so that the end of the pipe, when introduced into the sleeve, may pass in freely, but bear upon the ribs $d$ $d'$ without much flexibility. Between the ribs $d$ and $d'$ the sleeve is formed with a shallow chamber, which is circumferentially ribbed, and is adapted to receive and hold the asphaltum or other filling; also, the space between the ribs $d$ $d'$ is chambered and may be ribbed in the same way. In the ribs $d$ $d'$ are transverse passages $e$, through which the liquid filling may flow from the center to each end. In applying the coupling the sleeves, with the rope pressed quite down in the groove, is first slipped over one pipe, the diameter allowing it to be passed freely over the pipe. The adjoining pipe end is then brought up into line and the sleeves slipped back to a proper midway position over the ends. Then the projecting rope ends are drawn by means of pliers, and secured in any convenient way. As the ropes fit snugly in their grooves and are drawn tightly against the periphery of the pipe they form a tight joint inside the rib $d$ and prevent the hot asphaltum or other liquefied filling from passing out and aid in forming a strong gas-tight joint. It will be understood that the filling of asphaltum or asphaltum composition, which is poured in at H, forms the main packing P.

It fills the groove and adheres closely to all parts of the interior of the sleeve, and by reason of its elastic and adhesive nature it resists with great tenacity the pressure, which in the case of natural gas is often very great. The holes $h$ allow ventilation and permit the asphaltum to flow freely. After the filling is in place the rope ends are cut off and crossed, and the holes are filled by means of a metal screw-plug, $p$, which forces the rope ends within the sleeve and completes the packing at that point. A wooden plug may be also used under the metal plug, if desired.

In Fig. 2 is shown a modification of the coupling, in which greater flexibility is secured and an increased resistance to leakage. In this there is an interior circumferential groove, $f$, for a lead packing between the groove $a$ of the rope and the end of the sleeve. The rib $g$ outside of the groove $f$ is lower and is beveled to an edge. The rib $m$ between the grooves $f$ and $a$ is higher and fits approximately the pipe, and is between the rope and lead packings, for which it serves as a bearing. The rope is drawn up in the manner before explained, and luting or a pasteboard collar is placed about the pipe at the end of the sleeve before the lead is poured in. The hole $h$ is made large enough to include both grooves $f$ and $a$, and a half-round or bored plug of wood is forced in to hold and protect the rope and admit the lead. The plug is removed and the lead trimmed out before the asphaltum is poured in. This leaves the hole free for ventilation and the flow of the filling. The interior rib, $d$, is omitted, or is no higher than the others when lead is used and greater flexibility required, so that the pipe end bears on the yielding asphaltum packing, and when the pipe is swayed or bent in the sleeve it bears firmly on the rib $m$, and the edge of the outside rib cuts into the lead, thus insuring a close fit under all circumstances. The rope packing when used alone serves to retain the melted filling of asphaltum or equivalent substance, and when united with the filling as an additional resistance to the pressure of the gas in the pipe. When used with the lead, it serves, first, to prevent the lead from entering the space designed for the filling, and after the lead and filling are in place it serves as an additional resistance, as in the first instance.

In order to prevent the asphaltum or other filling from entering the pipe ends at their junction, I reduce their ends and wrap them with cloth covered with asphaltum and tied, and then covered with a metal clasp, as shown in Letters Patent No. 369,574, granted to me on the 6th of September, 1887. The asphaltum or prepared filling, suitably melted, is forced in by a screw-plug in hole H, and caused to fill all the interior of the sleeve not occupied by the pipe and packings. Passages are made across the interior ribs, $d'$, as shown in Fig. 1, to allow the filling to flow readily across.

I claim as my invention—

1. A pipe-coupling consisting of an inclosing-sleeve for the pipe ends, an interior chamber with an opening to the outside for a suitable filling, interior grooves at the end of the sleeve having openings to the outside, and a rope packing or gasket fitting in said grooves, with the ends extending to the outside, said gasket being compressed around the pipe by pressure applied to the free ends thereof, substantially as described.

2. A pipe-coupling consisting of a coupling-sleeve having an interior groove for a rope packing, and the groove between that and the end for lead, a hole to the outside leading to both grooves, and a rope and lead packing and a filling, substantially as described.

3. In combination, the sleeve having grooves for the rope and lead, the lead groove having an outer rib, with the outside thereof beveled to an edge, and the rope and lead packing, all substantially as described.

In testimony whereof I have signed my name to this specification in the presence of two subscribing witnesses.

ALFRED WILBUR.

Witnesses:
J. M. SPEAR,
ROBERT E. MORRIS.